(12) United States Patent
Togashi

(10) Patent No.: US 7,436,648 B2
(45) Date of Patent: Oct. 14, 2008

(54) MULTILAYER CAPACITOR AND MOUNTED STRUCTURE THEREOF

(75) Inventor: Masaaki Togashi, Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 11/711,684

(22) Filed: Feb. 28, 2007

(65) Prior Publication Data

US 2007/0211405 A1    Sep. 13, 2007

(30) Foreign Application Priority Data

Mar. 7, 2006    (JP)    ............... P2006-061394

(51) Int. Cl.
*H01G 4/005* (2006.01)
*H01G 4/228* (2006.01)
(52) U.S. Cl. .................. 361/303; 361/329; 361/306.3
(58) Field of Classification Search ......... 361/303–305, 361/311, 306.1, 306.2, 306.3, 309, 328–330
See application file for complete search history.

(56) References Cited

U.S. PATENT DOCUMENTS 6,515,842 B1 * 2/2003 Hayworth et al. ........... 361/303
7,227,260 B2 * 6/2007 Goto et al. ................. 257/724

FOREIGN PATENT DOCUMENTS

| JP | 06314634 A | * | 11/1994 |
| JP | 11154621 A | * | 6/1999 |
| JP | A 2000-208361 | | 7/2000 |
| JP | 2000252165 A | * | 9/2000 |
| JP | 2000331879 A | * | 11/2000 |
| JP | A-2001-44059 | | 2/2001 |
| JP | 2004047707 A | * | 2/2004 |

* cited by examiner

*Primary Examiner*—Eric Thomas
(74) *Attorney, Agent, or Firm*—Oliff & Berridge, PLC

(57) ABSTRACT

A multilayer capacitor has a multilayer body in which dielectric layers and internal electrode layers are alternately laminated, and terminal electrodes formed on each of two mutually opposed side faces of the multilayer body. Each internal electrode layer includes a plurality of internal electrodes arranged in an array direction along a direction perpendicular to a laminating direction of the multilayer body and parallel to the side faces. A plurality of internal electrodes included in one internal electrode layer are electrically connected to the terminal electrodes respectively. A distance between a plurality of internal electrodes included in one internal electrode layer is not less than 20 μm nor more than 200 μm.

2 Claims, 13 Drawing Sheets

MULTILAYER CAPACITOR AND MOUNTED STRUCTURE THEREOF

BACKGROUND OF THE INVENTION

1. Field of the Invention

The present invention relates to a multilayer capacitor and a mounted structure thereof.

2. Related Background Art

The voltage is becoming more and more lowered in power sources for supplying power to a central processing unit (CPU) mounted on digital electronic equipment, while the load current is increasing. Therefore, it became very difficult to control variation in supply voltage to within tolerances against rapid change of the load current, and a multilayer capacitor called a decoupling capacitor has been used as connected to a power source. An electric current is supplied from this multilayer capacitor to the CPU upon transient variation of the load current, so as to suppress the variation in supply voltage.

As the operating frequency of the CPU is becoming higher and higher in recent years, the load current is becoming higher in speed and larger in magnitude and there are demands for reduction in the equivalent series inductance (ESL) of the multilayer capacitor used as the decoupling capacitor. In order to meet such demands, Patent Document 1 discloses the multilayer capacitor in which a plurality of terminal electrodes are so arranged that the polarities of adjacent terminal electrodes are opposite to each other to cancel magnetic fields generated, thereby reducing the equivalent series inductance.

[Patent Document 1] Japanese Pat Application Laid-Open No. 2000-208361

SUMMARY OF THE INVENTION

However, the multilayer capacitor described in Patent Document 1 can include only one capacitance component and cannot be connected to a plurality of circuits. For this reason, a plurality of multilayer capacitors must be prepared for mounting capacitors to a plurality of circuits. It does not allow satisfactory reduction in mounting cost.

The present invention has been accomplished in order to solve the above problem, and an object of the invention is to provide a multilayer capacitor capable of achieving reduction in the equivalent series inductance while suppressing occurrence of a short circuit, and also capable of being connected to a plurality of circuits.

Incidentally, the Inventor conducted elaborate research on the multilayer capacitor capable of being connected to a plurality of circuits and achieving reduction in the equivalent series inductance, and came to find the fact that the equivalent series inductance was reduced when the capacitor had a multilayer body in which internal electrode layers including a plurality of internal electrodes and dielectric layers laminated alternately, and a plurality of terminal electrodes and when a distance between internal electrodes included in one internal electrode layer was set small enough to cancel out magnetic fields by electric currents flowing through adjoining internal electrodes. Further studies have been conducted based on this fact and led to a new finding that there arose another problem that a predetermined distance or less resulted in occurrence of a short circuit and reduction in capacitance.

Then the Inventor has come to contemplate a multilayer capacitor comprising a multilayer body in which internal electrode layers including a plurality of internal electrodes, and dielectric layers were alternately laminated, wherein the distance between internal electrodes included in one internal electrode layer was set to a predetermined value, which is the multilayer capacitor capable of being connected to a plurality of circuits and achieving satisfactory reduction in equivalent series inductance and also capable of suppressing occurrence of a short circuit.

In accordance with the result of the research as described above, an embodiment of the present invention is a multilayer capacitor comprising: a multilayer body in which a plurality of dielectric layers and a plurality of internal electrode layers are alternately laminated; and a plurality of terminal electrodes formed on each of two side faces of the multilayer body opposed to each other; wherein the plurality of terminal electrodes are formed on each of the two side faces so as to be opposed to each other in a facing direction of the two side faces, wherein each of the internal electrode layers includes a plurality of internal electrodes arranged in an array direction along a direction perpendicular to a laminating direction of the multilayer body and parallel to the two side faces, wherein the plurality of internal electrodes included in the respective internal electrode layers adjoining each other in the laminating direction with the dielectric layer in between are located so as to be opposed to each other in the laminating direction through the dielectric layer, wherein the internal electrodes opposed to each other in the laminating direction with the dielectric layer in between are electrically connected to the respective terminal electrodes opposed to each other in the facing direction of the two side faces, wherein the plurality of internal electrodes included in one internal electrode layer are electrically connected to the respective terminal electrodes being different from each other and formed on one of the two side faces, and wherein a distance between the internal electrodes included in one internal electrode layer and adjoining each other in the array direction is not less than 20 μm nor more than 200 μm.

Another embodiment of the present invention is a multilayer capacitor comprising: a multilayer body in which a plurality of dielectric layers and a plurality of internal electrode layers are alternately laminated; and a plurality of terminal electrodes formed on each of two side faces of the multilayer body opposed to each other; wherein the plurality of terminal electrodes are formed on each of the two side faces so as to be opposed to each other in a facing direction of the two side faces, wherein each of the internal electrode layers includes a plurality of internal electrodes arranged in an array direction along a direction perpendicular to a laminating direction of the multilayer body and parallel to the two side faces, wherein the plurality of internal electrodes included in the respective internal electrode layers adjoining each other in the laminating direction with the dielectric layer in between are located so as to be opposed to each other in the laminating direction through the dielectric layer, wherein the internal electrodes opposed to each other in the laminating direction with the dielectric layer in between are electrically connected to the respective terminal electrodes opposed to each other in the facing direction of the two side faces, wherein the internal electrodes included in one internal electrode layer and adjoining each other in the array direction are electrically connected to the respective terminal electrodes formed on the different side faces, and wherein a distance between the internal electrodes included in one internal electrode layer and adjoining each other in the array direction is not less than 20 μm nor more than 200 μm.

In the multilayer body of these multilayer capacitors, the internal electrode layers including the plurality of internal electrodes, and the dielectric layers are alternately laminated, and the plurality of internal electrodes included in the internal electrode layers adjoining each other in the laminating direction are opposed to each other through the dielectric layer. The internal electrodes are connected to the different terminal electrodes. For this reason, each of these multilayer capacitors can have a plurality of independent capacitors and these independent capacitors can be connected to different circuits. This permits these multilayer capacitors to reduce cost in mounting to a plurality of circuits. These multilayer capacitors can be connected to a substrate or the like so that directions of electric currents flowing in adjoining internal electrodes among the plurality of internal electrodes included in one internal electrode layer are opposite to each other. Furthermore, the distance between the adjoining internal electrodes is not more than 200 μm. For this reason, magnetic fields generated by electric currents flowing through the plurality of internal electrodes are canceled out, and thus the equivalent series inductance is reduced in these multilayer capacitors. In these multilayer capacitors, the distance between the adjoining internal electrodes is not less than 20 μm. This suppresses occurrence of a short circuit between the internal electrodes and suppresses reduction in capacitance.

An embodiment of mounted structure of a multilayer capacitor according to the present invention is a mounted structure in which the foregoing multilayer capacitor is mounted on a circuit substrate on which a plurality of land electrodes are formed, wherein the terminal electrodes located as adjoining each other on one side face are connected to the respective land electrodes of different polarities, and wherein the terminal electrodes opposed to each other in the facing direction of the two side faces are connected to the respective land electrodes of different polarities.

When one of the foregoing multilayer capacitors is mounted on the substrate as described above, magnetic fields generated by electric currents flowing in the plurality of internal electrodes included in one internal electrode layer cancel each other. For this reason, the foregoing mounted structure can reduce the equivalent series inductance of the multilayer capacitor. In the above-described mounted structure, the circuit substrate has the plurality of land electrodes and thus the multilayer capacitor can be connected to a plurality of circuits.

The plurality of land electrodes formed on the circuit substrate may belong to a plurality of different circuits. In this case, the multilayer capacitor is connected to a plurality of circuits.

The present invention successfully provides the multilayer capacitor capable of achieving reduction of equivalent series inductance while suppressing occurrence of a short circuit and capable of being connected to a plurality of circuits.

The present invention will become more fully understood from the detailed description given hereinbelow and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DESCRIPTION OF THE PREFERRED EMBODIMENTS

The embodiments will be described below in detail with reference to the accompanying drawings. In the description the same elements or elements with the same functionality will be denoted by the same reference symbols, without redundant description. The multilayer capacitors according to the embodiments will be described including mounted structures of multilayer capacitors according to embodiments.

First Embodiment

Figure 1:
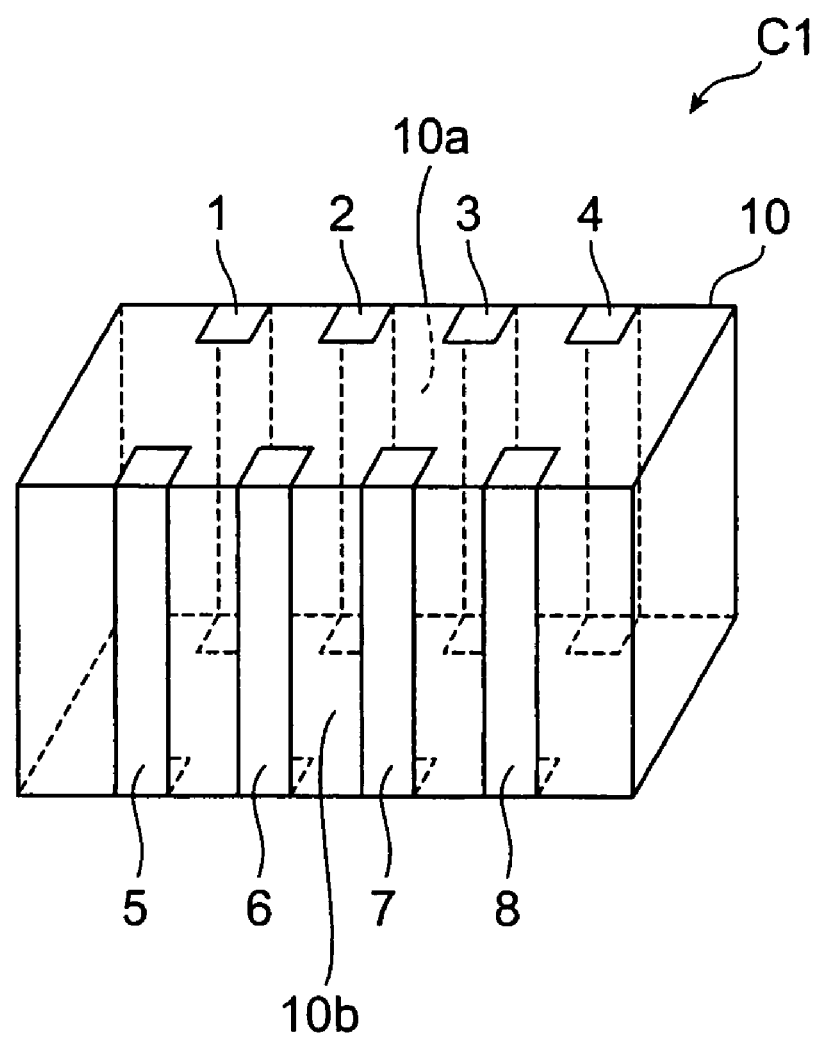
FIG. 1 is a perspective view of a multilayer capacitor according to the first embodiment.
Figure 2:
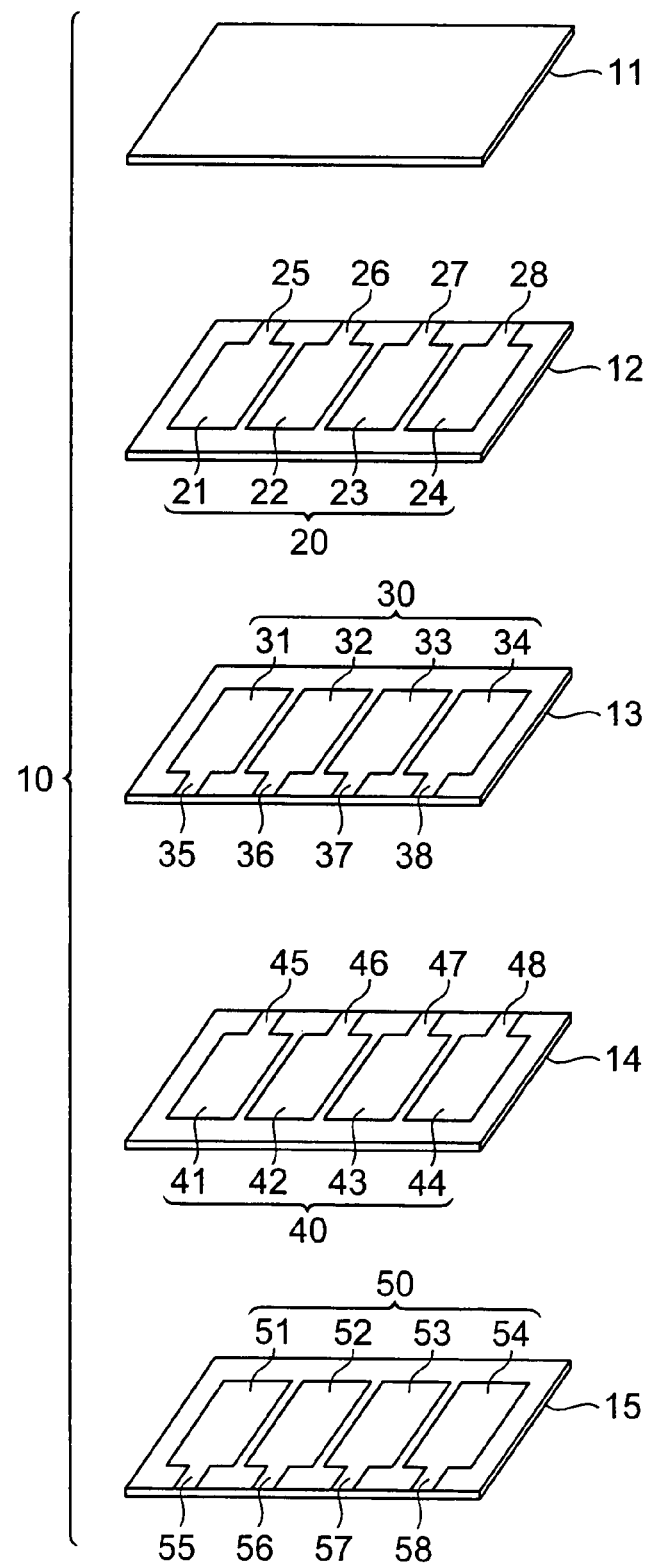
FIG. 2 is an exploded perspective view of a multilayer body included in the multilayer capacitor according to the first embodiment.

The multilayer capacitor according to the first embodiment will be described with reference to FIGS. 1 and 2. FIG. 1 is a perspective view of the multilayer capacitor according to the first embodiment. FIG. 2 is an exploded perspective view of a multilayer body included in the multilayer capacitor according to the first embodiment.

The multilayer capacitor C1, as shown in FIG. 1, comprises a multilayer body 10 of an approximately rectangular parallelepiped shape, and a plurality of terminal electrodes 1-8 (eight terminal electrodes in the present embodiment) formed on the multilayer body 10. The terminal electrodes 1-4, half of the terminal electrodes 1-8, are formed on a side face 10a extending in parallel with the laminating direction of the multilayer body 10 and in the longitudinal direction of the multilayer body 10. The rest half, terminal electrodes 5-8, are formed on another side face 10b of the multilayer body 10 opposed to the side face 10a.

The four terminal electrodes 1-4 and the rest four terminal electrodes 5-8 are arranged so as to be opposed to each other in the facing direction of the side face 10a and the side face 10b.

The multilayer body 10, as shown in FIG. 2, comprises a plurality of dielectric layers 11-15 (five layers in the present embodiment) and a plurality of internal electrode layers 20, 30, 40, 50 (four layers in the present embodiment) which are alternately laminated. In a practical multilayer capacitor C1, the layers are integrally formed so that no boundary can be visually recognized between the dielectric layers 11-15.

Each of the internal electrode layers 20, 30, 40, 50 includes a plurality of internal electrodes 21-24, 31-34, 41-44, 51-54 (four internal electrodes in the present embodiment), as shown in FIG. 2. The plurality of internal electrodes 21-24, 31-34, 41-44, 51-54 included in each internal electrode layer 20, 30, 40, 50 are arranged in an array direction along a direction perpendicular to the laminating direction of the multilayer body 10 described later and parallel to the two side faces 10a, 10b.

Each of the internal electrodes 21-24, 31-34, 41-44, 51-54 is of a rectangular shape the longitudinal direction of which agrees with the facing direction of the side face 10a and the side face 10b. Each internal electrode 21-24, 31-34, 41-44, 51-54 is formed at a position a predetermined distance apart from the side faces 10a, 10b of the multilayer body 10 parallel to the laminating direction of the dielectric layers 11-15 (which will be referred to simply as "laminating direction") in the multilayer body 10.

A plurality of internal electrodes included in respective internal electrode layers adjoining each other in the laminating direction with the dielectric layer in between are located so as to be opposed to each other in the laminating direction through the dielectric layer. Namely, the plurality of internal electrodes 21-24 and internal electrodes 31-34 included in the respective internal electrode layers 20, 30 adjoining each other with the dielectric layer 12 in between are located so as to be opposed to each other in the laminating direction through the dielectric layer 12. The plurality of internal electrodes 31-34 and internal electrodes 41-44 included in the respective internal electrode layers 30, 40 adjoining each other with the dielectric layer 13 in between are located so as to be opposed to each other in the laminating direction through the dielectric layer 13. The plurality of internal electrodes 41-44 and internal electrodes 51-54 included in the respective internal electrode layers 40, 50 adjoining each other with the dielectric layer 14 in between are located so as to be opposed to each other in the laminating direction through the dielectric layer 14. Therefore, the plurality of internal electrodes included in the plurality of internal electrode layers are located so as to approximately overlap each other, when viewed from the laminating direction.

The internal electrodes opposed to each other in the laminating direction with the dielectric layer in between are electrically connected to the respective terminal electrodes opposed to each other in the facing direction of the two side faces. Namely, the internal electrodes 21, 31 opposed to each other in the laminating direction with the dielectric layer 12 in between, the internal electrodes 31, 41 opposed to each other in the laminating direction with the dielectric layer 13 in between, and the internal electrodes 41, 51 opposed to each other in the laminating direction with the dielectric layer 14 in between are electrically connected to the terminal electrodes 1, 5, respectively. The internal electrodes 22, 32 opposed to each other in the laminating direction with the dielectric layer 12 in between, the internal electrodes 32, 42 opposed to each other in the laminating direction with the dielectric layer 13 in between, and the internal electrodes 42, 52 opposed to each other in the laminating direction with the dielectric layer 14 in between are electrically connected to the terminal electrodes 2, 6, respectively. The internal electrodes 23, 33 opposed to each other in the laminating direction with the dielectric layer 12 in between, the internal electrodes 33, 43 opposed to each other in the laminating direction with the dielectric layer 13 in between, and the internal electrodes 43, 53 opposed to each other in the laminating direction with the dielectric layer 14 in between are electrically connected to the terminal electrodes 3, 7, respectively. The internal electrodes 24, 34 opposed to each other in the laminating direction with the dielectric layer 12 in between, the internal electrodes 34, 44 opposed to each other in the laminating direction with the dielectric layer 13 in between, and the internal electrodes 44, 54 opposed to each other in the laminating direction with the dielectric layer 14 in between are electrically connected to the terminal electrodes 4, 8, respectively. Each set of the terminal electrodes 1, 5, the terminal electrodes 2, 6, the terminal electrodes 3, 7, and the terminal electrodes 4, 8 are opposed to each other in the facing direction of the side faces 10a, 10b.

A plurality of internal electrodes included in one internal electrode layer are electrically connected to respective, mutually different terminal electrodes formed on one side face out of the two side faces. Namely, the plurality of internal electrodes 21-24 included in the internal electrode layer 20 are electrically connected through corresponding lead conductors 25-28 to the terminal electrodes 1-4 formed on the side face 10a, respectively. The plurality of internal electrodes 31-34 included in the internal electrode layer 30 are electrically connected through corresponding lead conductors 35-38 to the terminal electrodes 5-8 formed on the side face 10b, respectively. The plurality of internal electrodes 41-44 included in the internal electrode layer 40 are electrically connected through corresponding lead conductors 45-48 to the terminal electrodes 1-4 formed on the side face 10a, respectively. The plurality of internal electrodes 51-54 included in the internal electrode layer 50 are electrically connected through corresponding lead conductors 55-58 to the terminal electrodes 5-8 formed on the side face 10b, respectively.

In the multilayer capacitor C1, as described above, the plurality of internal electrodes opposed to each other in the laminating direction are alternately connected to the different terminal electrodes, and these internal electrodes are so arranged that a plurality of internal electrodes (four internal electrodes in the present embodiment) are arrayed in the array direction and are connected to the respective different terminal electrodes. For this reason, the multilayer capacitor C1 includes four independent capacitors, i.e., a capacitor comprising the internal electrodes 21, 31, 41, 51, a capacitor comprising the internal electrodes 22, 32, 42, 52, a capacitor comprising the internal electrodes 23, 33, 43, 53, and a capacitor comprising internal electrodes 24, 34, 44, 54.

Figure 3A:
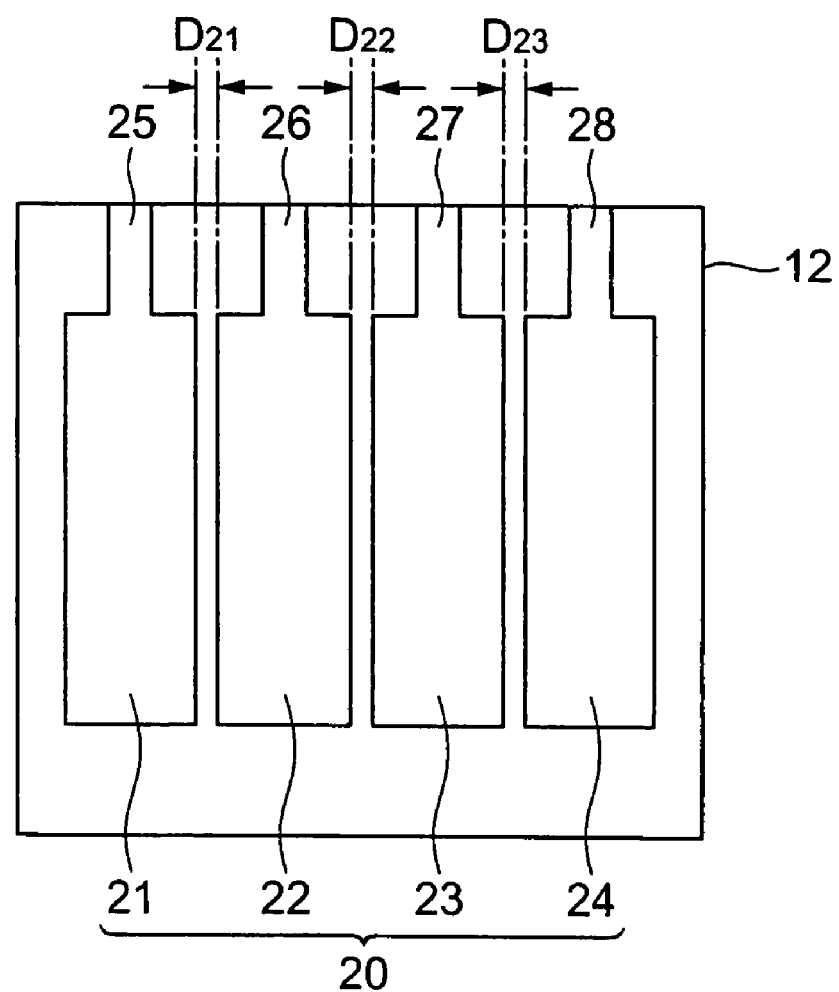
FIG. 3A is a drawing for explaining a relation among a plurality of internal electrodes included in an internal electrode layer.
Figure 3B:
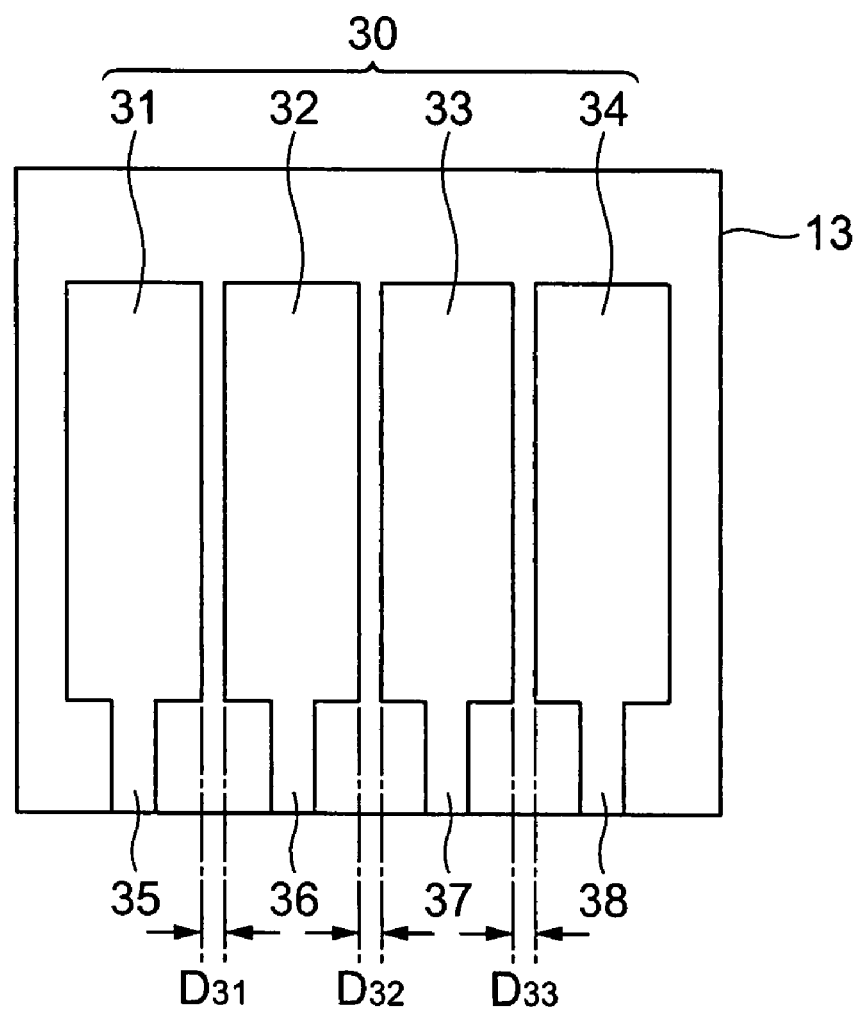
FIG. 3B is a drawing for explaining a relation among a plurality of internal electrodes included in an internal electrode layer.

The relation among each set of the internal electrodes 21-24 included in the internal electrode layer 20, the internal electrodes 31-34 included in the internal electrode layer 30, the internal electrodes 41-44 included in the internal electrode layer 40, and the internal electrodes 51-54 included in the internal electrode layer 50 will be described with reference to FIGS. 3A and 3B. The distance along the array direction between the plurality of internal electrodes 21-24, 31-34, 41-44, 51-54 included in one internal electrode layer 20, 30, 40, 50 is not less than 20 μm nor more than 200 μm and, more preferably, not less than 20 μm nor more than 100 μm. FIG. 3A is a drawing for explaining the relation among the plurality of internal electrodes 21-24 included in the internal electrode layer 20. FIG. 3B is a drawing for explaining the relation among the plurality of internal electrodes 31-34 included in the internal electrode layer 30.

As shown in FIG. 3A, let $D_{21}$ be a distance between mutually adjoining edges (sides) of the internal electrode 21 and the internal electrode 22 included in the internal electrode layer 20 and adjoining each other along the array direction. Then Formula (1) below holds.

$$20 \text{ μm} \leq D_{21} \leq 200 \text{ μm} \tag{1}$$

Let $D_{22}$ be a distance between mutually adjacent edges (sides) of the two internal electrodes 22, 23 adjoining each other along the array direction. Then the following formula holds: $20 \text{ μm} \leq D_{22} \leq 200 \text{ μm}$. Let $D_{23}$ be a distance between mutually adjacent edges (sides) of the two internal electrodes 23, 24 adjoining each other along the array direction. Then the following formula holds: $20 \text{ μm} \leq D_{23} \leq 200 \text{ μm}$.

On the other hand, as shown in FIG. 3B, let $D_{31}$ be a distance between mutually adjacent edges (sides) of the internal electrode 31 and the internal electrode 32 included in the internal electrode layer 30 and adjoining each other along the array direction. Then Formula (2) below holds.

$$20 \text{ μm} \leq D_{31} \leq 200 \text{ μm} \tag{2}$$

Let $D_{32}$ be a distance between mutually adjacent edges (sides) of the two internal electrodes 32, 33 adjoining each other along the array direction. Then the following formula holds: $20 \text{ μm} \leq D_{32} \leq 200 \text{ μm}$. Let $D_{33}$ be a distance between mutually adjacent edges (sides) of the two internal electrodes 33, 34 adjoining each other along the array direction. Then the following formula holds: $20 \text{ μm} \leq D_{33} \leq 200 \text{ μm}$.

Figure 4:
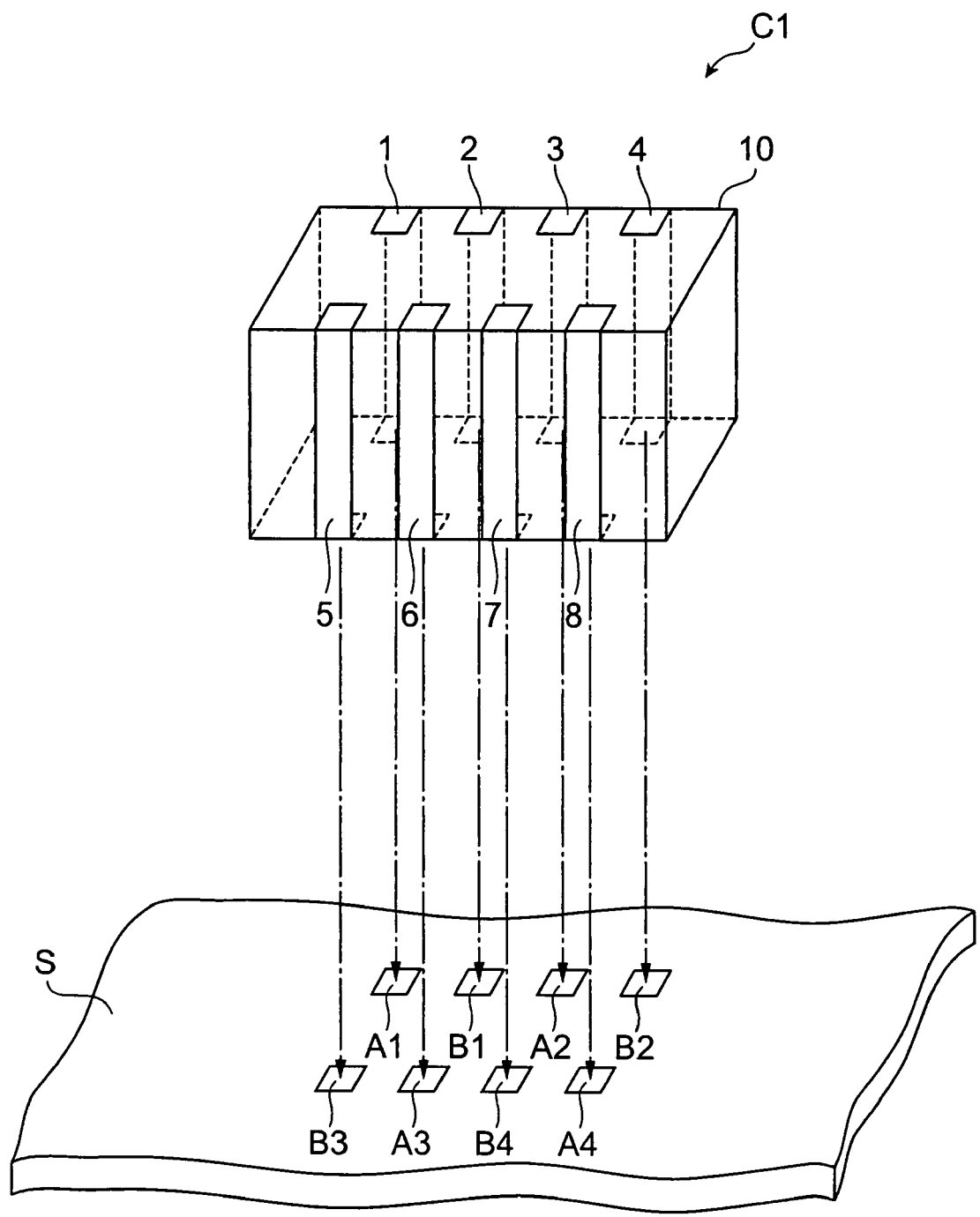
FIG. 4 is a drawing for explaining a mounted structure of the multilayer capacitor of the first embodiment to be mounted onto a circuit substrate.

A mounted structure of the multilayer capacitor C1 to be mounted onto a circuit substrate will be described below with reference to FIG. 4. FIG. 4 is a drawing for explaining a mounted structure of the multilayer capacitor C1 to be mounted onto a circuit substrate S on which a plurality of land electrodes A1-A4, B1-B4 are formed.

As shown in FIG. 4, there are a plurality of land electrodes A1-A4 (four land electrodes in the present embodiment) and a plurality of land electrodes B1-B4 (four land electrodes in the present embodiment) formed on the circuit substrate S. The land electrodes A1-A4 have the same polarity and are connected, for example, to positive wires. The land electrodes B1-B4 have the same polarity and are connected, for example, to negative wires. The land electrodes A1-A4 and the land electrodes B1-B4 have the mutually different polarities.

The land electrodes A1, B1, A2, B2 are arranged in this order along a predetermined direction on the substrate S. The land electrodes B3, A3, B4, A4 are arranged in this order along a direction parallel to the array direction of the land electrodes A1, B1, A2, B2 on the substrate S. Each set of the land electrode A1 and land electrode B3, the land electrode B1 and land electrode A3, the land electrode A2 and land electrode B4, and the land electrode B2 and land electrode A4 are arranged to be opposed to each other in a direction perpendicular to the array direction of the land electrodes A1, B1, A2, B2 on the substrate S.

The multilayer capacitor C1 is mounted on the substrate S so that the terminal electrodes 1, 3, 6, 8 of the multilayer capacitor C1 are connected to the land electrodes A1-A4, respectively, and so that the terminal electrodes 2, 4, 5, 7 of the multilayer capacitor C1 are connected to the land electrodes B1-B4, respectively. Therefore, the terminal electrodes located as adjoining each other on the side face 10a of the multilayer body 10 are connected to the land electrodes of the different polarities. The terminal electrodes opposed to each other in the facing direction of the side faces 10a, 10b are connected to the land electrodes of the different polarities.

Namely, the terminal electrodes connected to the mutually adjacent internal electrodes among the plurality of internal electrodes included in one internal electrode layer are connected to the land electrodes of the mutually different polarities. The terminal electrodes connected to the internal electrodes opposed to each other in the laminating direction through the dielectric layer are connected to the land electrodes of the mutually different polarities.

Figure 5:
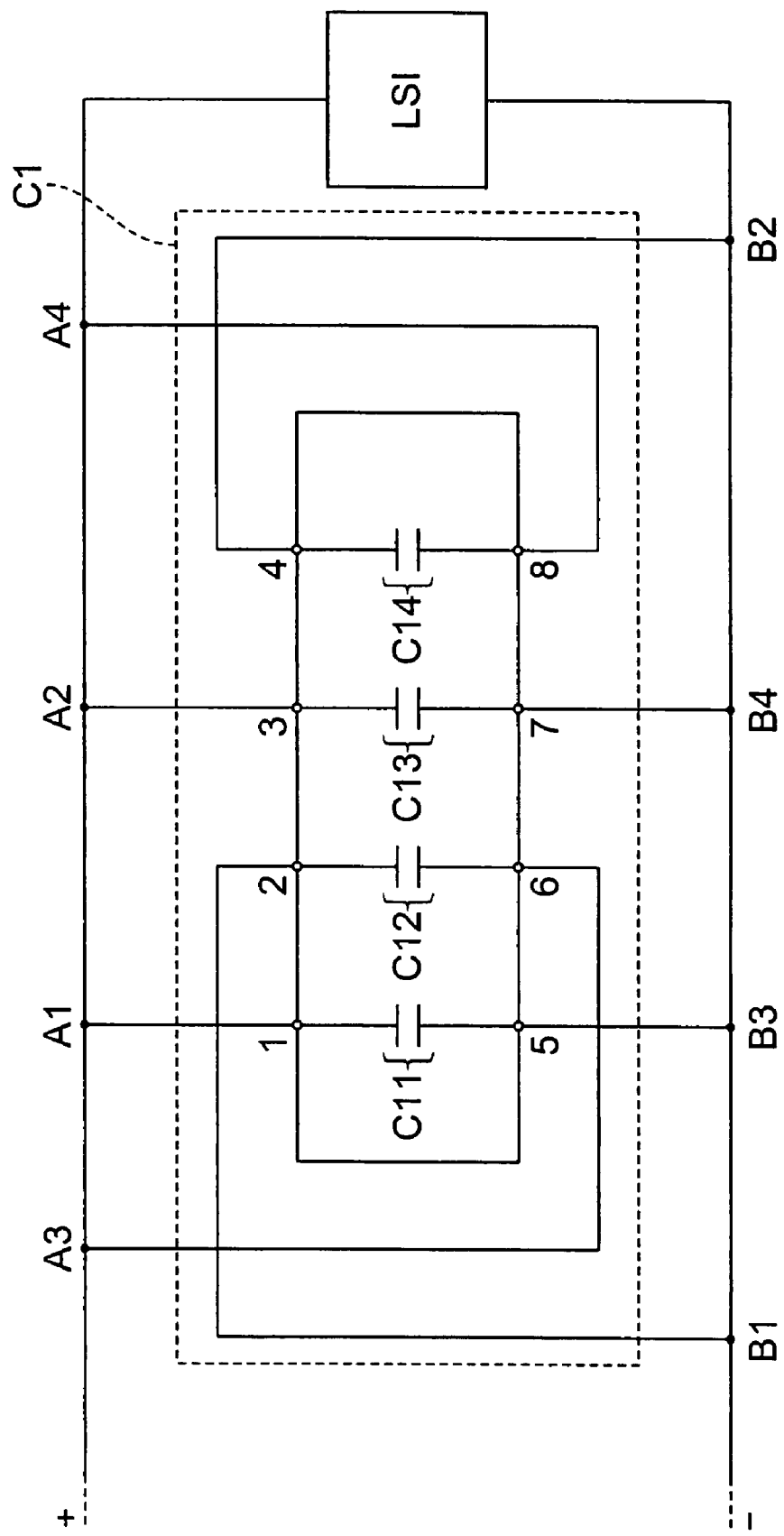
FIG. 5 is an equivalent circuit diagram of the mounted structure in which the multilayer capacitor of the first embodiment is mounted on a circuit substrate.
Figure 6:
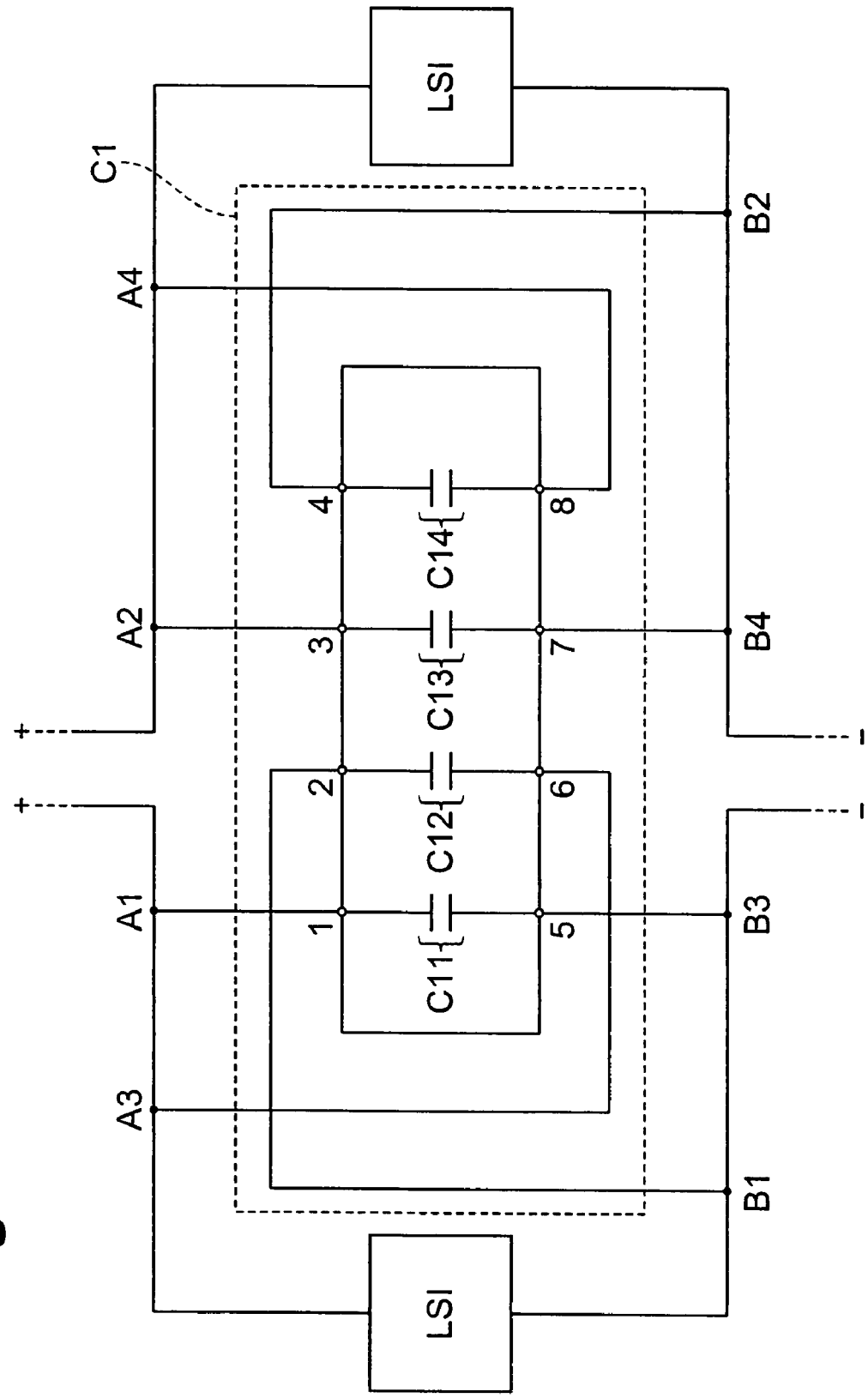
FIG. 6 is an equivalent circuit diagram of the mounted structure in which the multilayer capacitor of the first embodiment is mounted on a circuit substrate.

FIGS. 5 and 6 are equivalent circuit diagrams of substrates S on which the multilayer capacitor C1 is mounted. In FIGS. 5 and 6, the terminal electrodes 1, 3, 6, 8 are connected to the respective land electrodes A1-A4 of the positive polarity, and the terminal electrodes 2, 4, 5, 7 to the respective land electrodes B1-B4 of the negative polarity. FIG. 5 is an equivalent circuit diagram of a mounted structure in which the multilayer capacitor C1 is connected to one circuit including one LSI. FIG. 6 is an equivalent circuit diagram of a mounted structure in which the multilayer capacitor C1 is connected to two circuits each of which includes one LSI. In the equivalent circuit diagram shown in FIG. 6, the terminal electrodes 1, 2, 5, 6 are connected to one circuit, and the terminal electrodes 3, 4, 7, 8 are connected to another circuit.

The multilayer capacitor C1 includes the four independent capacitors (capacitance components). Specifically, a capacitor (capacitance component) C11 is formed by the internal electrodes 21, 31, 41, 51 between the terminal electrodes 1, 5; a capacitor (capacitance component) C12 by the internal electrodes 22, 32, 42, 52 between the terminal electrodes 2, 6; a capacitor (capacitance component) C13 by the internal electrodes 23, 33, 43, 53 between the terminal electrodes 3, 7; and a capacitor (capacitance component) C14 by the internal electrodes 24, 34, 44, 54 between the terminal electrodes 4, 8. Since these capacitors C11-C14 all are provided with the different terminal electrodes and are independent of each other, they can be connected all to a single circuit as shown in FIG. 5 or to a plurality of different circuits as shown in FIG. 6. As described above, the multilayer capacitor C1 enables its capacitors C11-C114 to be connected to a plurality of circuits, without need for mounting a plurality of multilayer capacitors, and thus reduces cost in connection to a plurality of circuits.

The multilayer capacitor C1 can be connected to a substrate or the like so that directions of electric currents flowing through mutually adjacent internal electrodes among the plurality of internal electrodes 21-24, 31-34, 41-44, 51-54 included in one internal electrode layer 20, 30, 40, 50 are opposite to each other. Namely, for example, in the case where the multilayer capacitor is mounted on the substrate as shown in FIG. 4 (i.e., in the case where the equivalent circuit diagram is, for example, as shown in FIG. 5 or in FIG. 6), the polarity of the internal electrodes 21, 23, 41, 43 is different from that of the internal electrodes 22, 24, 42, 44 in the internal electrode layers 20, 40 and all of these internal electrodes are connected to the terminal electrodes 1-4 formed on the same side face 10a. Furthermore, the polarity of the internal electrodes 31, 33, 51, 53 is different from that of the internal electrodes 32, 34 52, 54 in the internal electrode layers 30, 50 and all of these electrodes are connected to the terminal electrodes 5-8 formed on the same side face 10b. For this reason, directions of electric currents flowing through mutually adjacent internal electrodes are opposite to each other in the internal electrodes 21-24, 31-34, 41-44, 51-54. Furthermore, in each internal electrode layer 20, 30, 40, 50, the distance between the internal electrodes is very narrow, 200 μm or less. Therefore, in each internal electrode layer 20, 30, 40, 50, magnetic fields generated by electric currents flowing through the plurality of internal electrodes 21-24, 31-34, 41-44, 51-54 cancel each other, so as to reduce the equivalent series inductance in the multilayer capacitor C1.

When the distance between the internal electrodes in each internal electrode layer 20, 30, 40, 50 is not more than 100 μm, the equivalent series inductance is more reduced.

In each internal electrode layer 20, 30, 40, 50, the distance between the internal electrodes is not less than 20 μm. This results in suppressing occurrence of a short circuit between the plurality of internal electrodes in each internal electrode layer 20, 30, 40, 50. This leads to prevention of reduction in capacitance due to a short circuit in the multilayer capacitor C1.

Table 1 below presents practical examples of the multilayer capacitor according to the first embodiment. Table 1 shows examples of measurement of change in equivalent series inductance value (ESL (pH)) against change in the distance between the plurality of internal electrodes in each internal electrode layer from 20 μm to 200 μm, and a comparative example of measurement of equivalent series inductance value (ESL (pH)) where the distance between the plurality of internal electrodes in each internal electrode layer is 250 μm.

TABLE 1

| | Distance (μm) | | | | | | | |
|---|---|---|---|---|---|---|---|---|
| | 20 | 50 | 80 | 100 | 150 | 180 | 200 | 250 |
| ESL (pH) | 72 | 83 | 89 | 99 | 143 | 188 | 200 | 242 |

All the multilayer capacitors of the examples and comparative example have the same configuration as the multilayer capacitor C1 of the first embodiment and are constructed as follows: the dimensions of the contour of each multilayer capacitor, when viewed from the thickness direction, are about 2.0 mm×about 1.25 mm; the thickness is about 0.8 mm; the capacitance of the multilayer capacitor is about 0.1 μF; the number of internal electrodes in each internal electrode layer is 4; the number of dielectric layers laminated is 21; the number of internal electrode layers laminated is 20.

The examples indicate the equivalent series inductance values (ESL (pH)) against change in the distance between the plurality of internal electrodes in each internal electrode layer in the range from 20 μm to 200 μm. The comparative example indicates the equivalent series inductance value (ESL (pH)) where the distance between the plurality of internal electrodes in each internal electrode layer is 250μm As seen from Table 1, the equivalent series inductance is not more than 200 pH when the distance between the internal electrodes is not more than 200 μm. It was confirmed that the equivalent series inductance exceeded 240 pH when the distance between the internal electrodes was 250 μm. It was also confirmed that when the distance between the internal electrodes was not more than 100 μm, the equivalent series inductance was less than 100 pH and the equivalent series inductance was largely reduced.

Particularly, in the case where the multilayer capacitor is connected to a power source for supplying power to a central processing unit (CPU) mounted on digital electronic equipment, the equivalent series inductance is preferably smaller than about 200 pH and more preferably 100 pH. The following will detail the reason why the preferred equivalent series inductance is about 200 pH.

Figure 9:
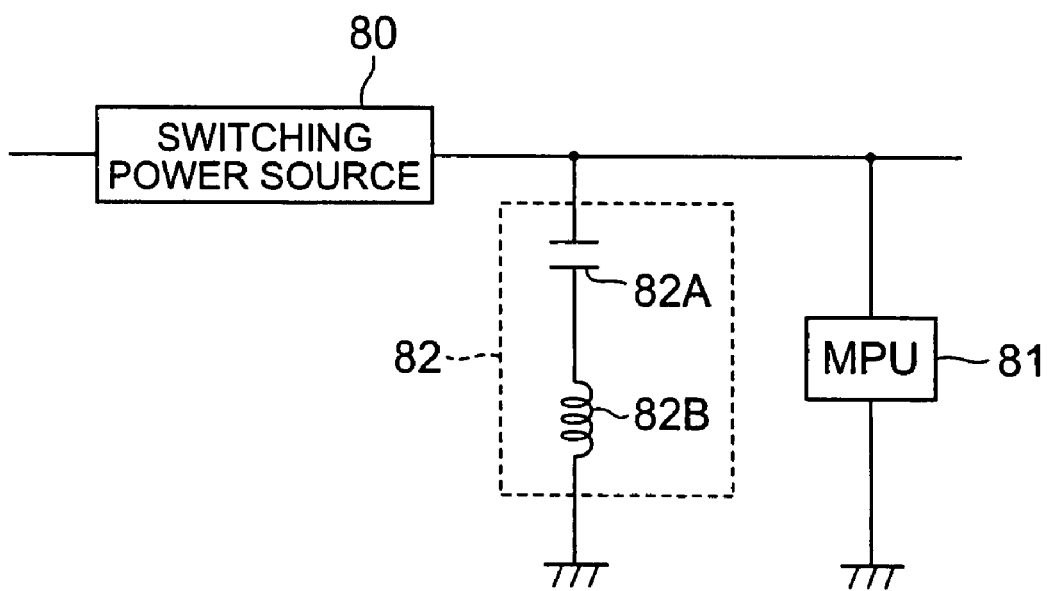
FIG. 9 is an equivalent circuit diagram showing a relation between a switching power source for supplying power to an MPU, and a multilayer capacitor.

FIG. 9 is an equivalent circuit diagram showing a relation between a switching power source (DC-DC converter) 80 for supplying power to MPU (microprocessor) 81, and a multilayer capacitor 82 functioning as a decoupling capacitor. In general, there are a residual inductance and a residual resistance in a capacitor. In the equivalent circuit diagram shown in FIG. 9, the multilayer capacitor 82 includes an equivalent series inductance (ESL) component 82B as a residual inductance in addition to a capacitance component 82A, and the residual resistance is omitted from the illustration. Recently, the load current is becoming faster and larger, with further increase in the operating frequency of MPU 81. For this reason, the switching power source 80 for supplying power to MPU 81 is demanded to achieve quicker response and a voltage drop Vd of MPU 81 due to sudden current variation (di/dt) is required to be controlled to within a rated value. The tolerance of voltage drop is within 5% of operating voltage. The operating voltage of MPU is becoming more and more lowered in recent years, and is generally about 1.5 V. When the operating voltage is 1.5 V, the tolerance of the voltage drop is 1.5 (V)×0.05=0.075 (V).

The general current variation (di/dt) is approximately 100 A/μsec, but in the case of the power sources being required to achieve quick response, the current variation required is not less than 350 A/μsec. Voltage variation Vd caused by variation of electric current satisfies a relation expressed by Eq (3) below with the value of the equivalent series inductance (ESL) component 82B in the multilayer capacitor 82.

$$Vd = ESL \times (di/dt) \qquad (3)$$

It, therefore, turns out that in the case of the operating voltage of 1.5 V and the current variation of 350 A/μsec, the multilayer capacitor is required to have the equivalent series inductance (ESL) value of not more than ESL=Vd/(di/dt)= $75 \times 10^{-3}/(350 \times 10^{6})$=214 (pH). In manufacturing the multilayer capacitor satisfying the equivalent series inductance of not more than 214 pH, it is preferable to manufacture the multilayer capacitor with the target of not more than 200 pH, in view of fluctuations during production. It is understood from this that in the case where the multilayer capacitor is connected to the power source for supply of power to the central processing unit (CPU) mounted on digital electronic equipment, the equivalent series inductance is preferably smaller than about 200 pH and more preferably 100 pH.

The above verified the effectiveness of the present embodiment.

Second Embodiment

Figure 7:
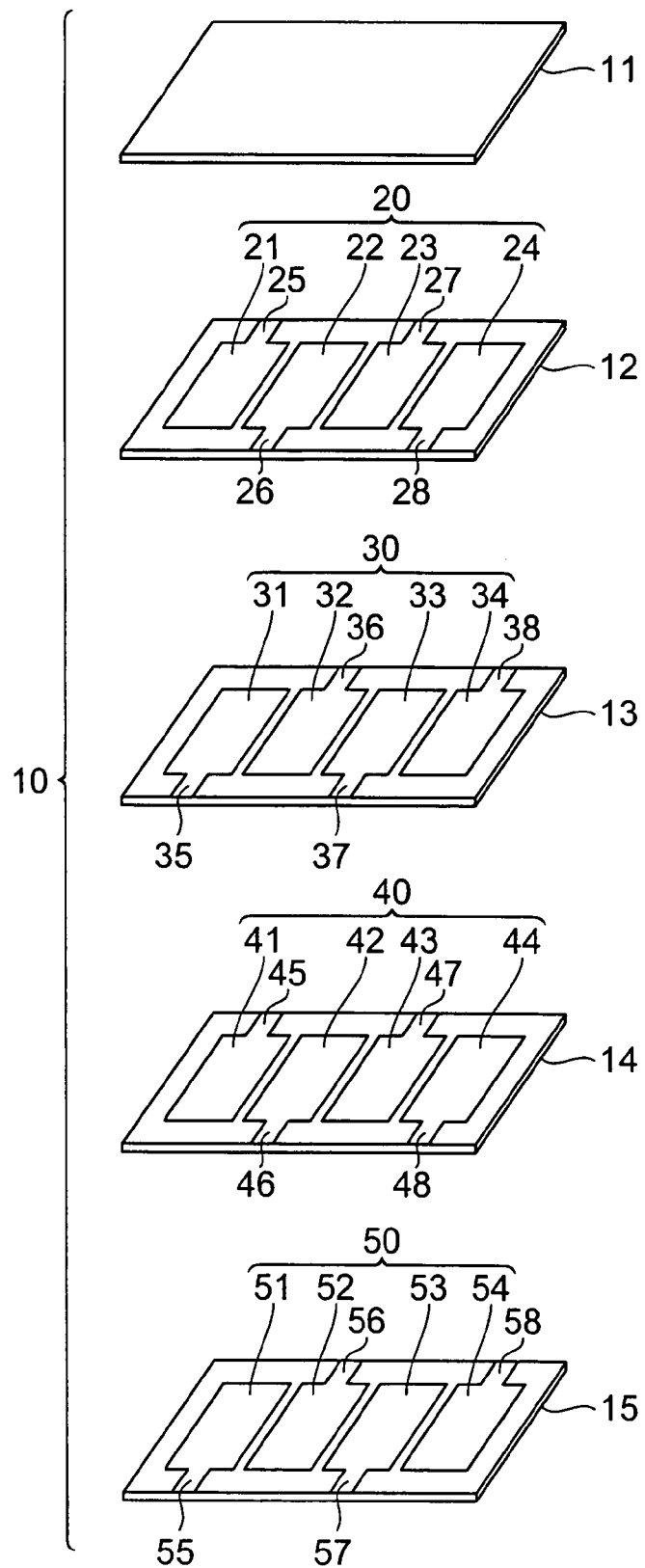
FIG. 7 is an exploded perspective view of a multilayer body included in a multilayer capacitor according to the second embodiment.
Figure 10:
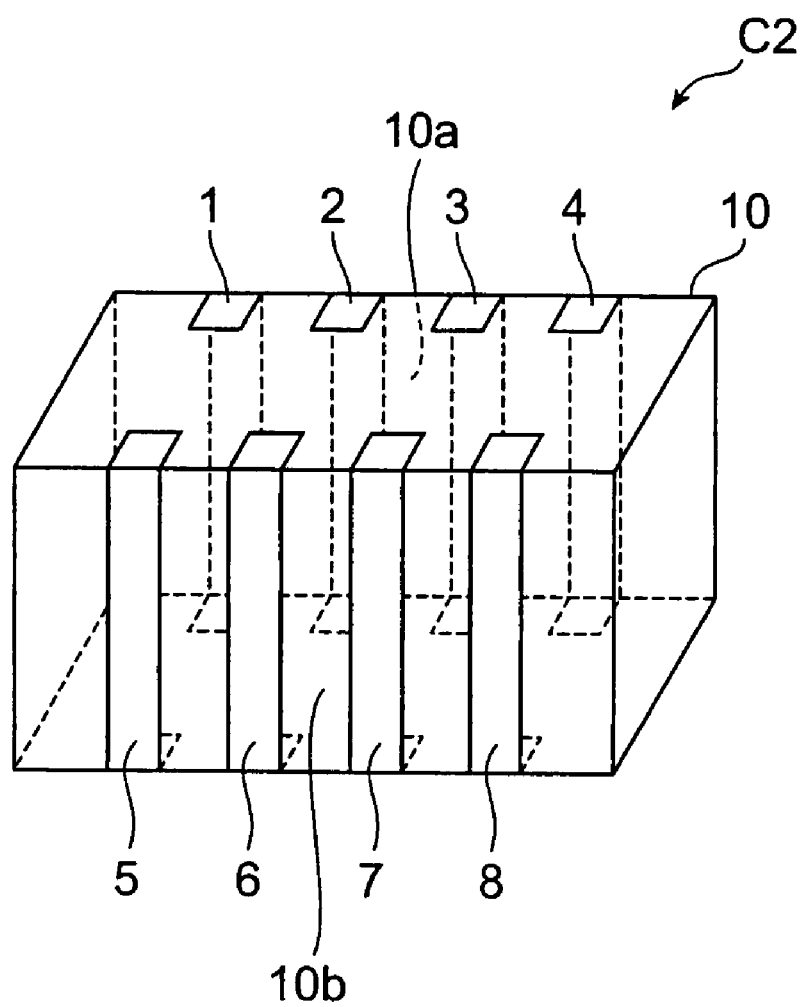
FIG. 10 is a perspective view of a multilayer capacitor according to the second embodiment.

The multilayer capacitor according to the second embodiment will be described with reference to FIGS. 7 and 10. The multilayer capacitor C2 of the second embodiment is different from the multilayer capacitor C1 of the first embodiment in that the ends of the adjacent internal electrodes included in one internal electrode layer are connected to the terminal electrodes on the different sides in the longitudinal direction. FIG. 10 is a perspective view of the multilayer capacitor according to the second embodiment. FIG. 7 is an exploded perspective view of a multilayer body included in the multilayer capacitor of the second embodiment.

The multilayer capacitor C2 of the second embodiment, as shown in FIG. 10, comprises a multilayer body 10 and terminal electrodes 1-8 formed on the multilayer body 10 as the multilayer capacitor C1 of the first embodiment does.

The multilayer body 10, as shown in FIG. 7, comprises a plurality of dielectric layers 11-15 (five layers in the present embodiment) and a plurality of internal electrode layers 20, 30, 40, 50 (four layers in the present embodiment) which are alternately laminated.

Figure 8A:
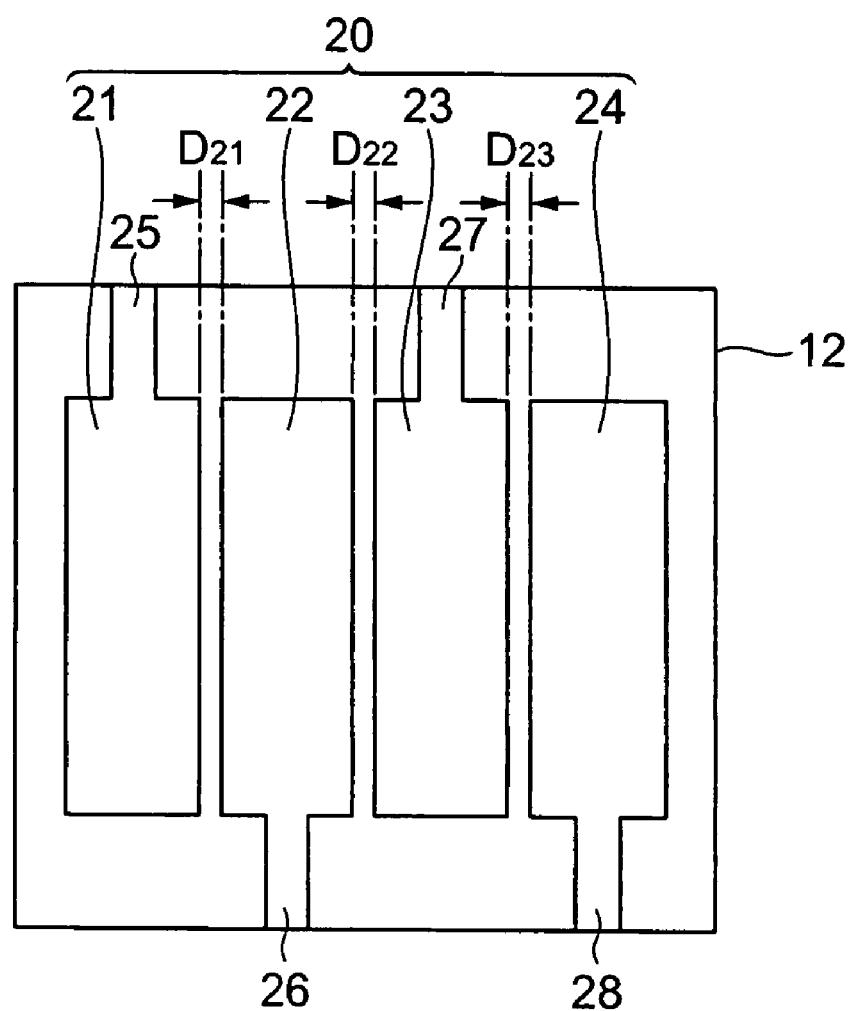
FIG. 8A is a drawing for explaining a relation among a plurality of internal electrodes included in an internal electrode layer.
Figure 8B:
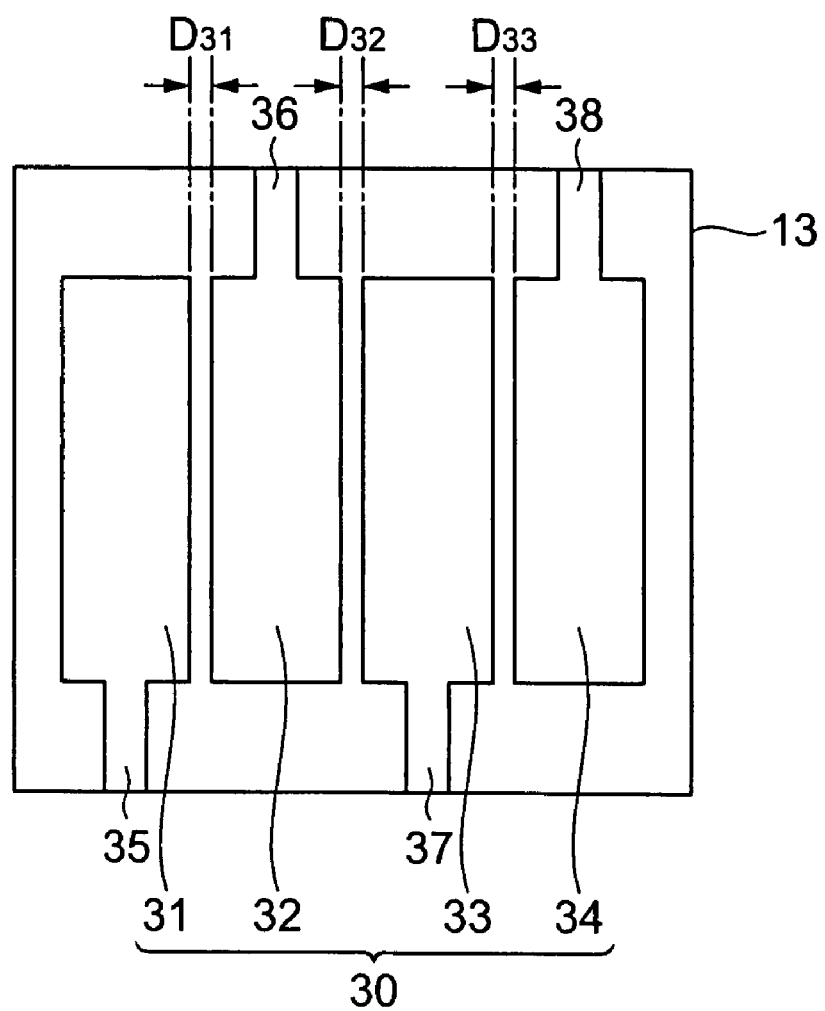
FIG. 8B is a drawing for explaining a relation among a plurality of internal electrodes included in an internal electrode layer.

Each internal electrode layer 20, 30, 40, 50 includes a plurality of internal electrodes 21-24, 31-34, 41-44, 51-54 (four electrodes in each layer in the present embodiment), as shown in FIGS. 8A and 8B.

The plurality of internal electrodes 21-24, 31-34, 41-44, 51-54 included in each internal electrode layer 20, 30, 40, 50 are arranged in an array direction along a direction perpendicular to the laminating direction of the multilayer body 10 and parallel to two side faces 10a, 10b. Each of the internal electrodes 21-24, 31-34, 41-44, 51-54 is of a rectangular shape the longitudinal direction of which agrees with the facing direction of the side face 10a and the side face 10b. The plurality of internal electrodes 21-24, 31-34, 41-44, 51-54 included in each of the internal electrode layers 20, 30, 40, 50 adjoining each other in the laminating direction with the dielectric layer 12-14 in between are located so as to be opposed to each other in the laminating direction through the dielectric layer 12-14.

The internal electrodes 21-24, 31-34, 41-44, 51-54 opposed to each other in the laminating direction with the dielectric layer 12-14 in between are electrically connected to the respective terminal electrodes 1-8 opposed to each other in the facing direction of the two side faces 10a, 10b.

The internal electrodes 21-24, 31-34, 41-44, 51-54 included in one internal electrode layer 20, 30, 40, 50 and adjoining each other in the array direction are electrically connected to the terminal electrodes 1-8 formed on the different side faces 10a, 10b. Namely, the internal electrodes 21, 22, the internal electrodes 22, 23, and the internal electrodes 23, 24 included in the internal electrode layer 20 and adjoining each other in the array direction are connected to the respective terminal electrodes 1, 6, to the respective terminal electrodes 6, 3, and to the respective terminal electrodes 3, 8, respectively, formed on the different side faces 10a, 10b. The internal electrodes 41, 42, the internal electrodes 42, 43, and the internal electrodes 43, 44 included in the internal electrode layer 40 and adjoining each other in the array direction are connected to the respective terminal electrodes 1, 6, to the respective terminal electrodes 6, 3, and to the respective terminal electrodes 3, 8, respectively, formed on the different side faces 10a, 10b.

On the other hand, the internal electrodes 31, 32, the internal electrodes 32, 33, and the internal electrodes 33, 34 included in the internal electrode layer 30 and adjoining each other in the array direction are connected to the respective terminal electrodes 5, 2, to the respective terminal electrodes 2, 7, and to the respective terminal electrodes 7, 4, respectively, formed on the different side faces 10b, 10a. The internal electrodes 51, 52, the internal electrodes 52, 53, and the internal electrodes 53, 54 included in the internal electrode layer 50 and adjoining each other in the array direction are connected to the respective terminal electrodes 5, 2, to the respective terminal electrodes 2, 7, and to the respective terminal electrodes 7, 4, respectively, formed on the different side faces 10b, 10a.

In the multilayer capacitor C2 of the second embodiment, as described above, the plurality of internal electrodes opposed to each other in the laminating direction are alternately connected to the different terminal electrodes, and these internal electrodes are arrayed as multiple electrodes (four electrodes in each layer in the present embodiment) in the array direction and are connected to the respective different terminal electrodes. For this reason, the multilayer capacitor C2 of the second embodiment includes four independent capacitors, i.e., a capacitor comprising the internal electrodes 21, 31, 41, 51, a capacitor comprising the internal electrodes 22, 32, 42, 52, a capacitor comprising the internal electrodes 23, 33, 43, 53, and a capacitor comprising the internal electrodes 24, 34, 44, 54.

The relation among the plurality of internal electrodes 21-24, 31-34, 41-44, 51-54 included in the internal electrode layers 20, 30, 40, 50 will be described with reference to FIGS. 8A and 8B. The distance along the array direction between the plurality of internal electrodes 21-24, 31-34, 41-44, 51-54 included in one internal electrode layer 20, 30, 40, 50 is not less than 20 µm nor more than 200 µm and, more preferably, not less than 20 µm nor more than 100 µm. FIG. 8A is a drawing for explaining the relation among the plurality of internal electrodes 21-24 included in the internal electrode layer 20. FIG. 8B is a drawing for explaining the relation among the plurality of internal electrodes 31-34 included in the internal electrode layer 30.

As shown in FIG. 8A, let $D_{21}$ be a distance between adjacent edges (sides) of the two internal electrodes 21, 22 included in the internal electrode layer 20 and adjoining each other along the array direction. Then the following relation holds: $20\ \mu m \leq D_{21} \leq 200\ \mu m$. Let $D_{22}$ be a distance between adjacent edges of the two internal electrodes 22, 23 adjoining each other. Then the following relation holds: $20\ \mu m \leq D_{22} \leq 200\ \mu m$. Let $D_{23}$ be a distance between adjacent edges of the two internal electrodes 23, 24 adjoining each other. Then the following relation holds: $20\ \mu m \leq D_{23} \leq 200\ \mu m$.

On the other hand, as shown in FIG. 8B, let $D_{31}$ be a distance between adjacent edges (sides) of the two internal electrodes 31, 32 included in the internal electrode layer 30 and adjoining each other along the array direction. Then the following relation holds: $20\ \mu m \leq D_{31} \leq 200\ \mu m$. Let $D_{32}$ be a distance between adjacent edges of the two internal electrodes 32, 33 adjoining each other. Then the following relation holds: $20\ \mu m \leq D_{32} \leq 200\ \mu m$. Let $D_{33}$ be a distance between adjacent edges of the two internal electrodes 33, 34 adjoining each other. Then the following relation holds: $20\ \mu m \leq D_{33} \leq 200\ \mu m$.

Figure 11:
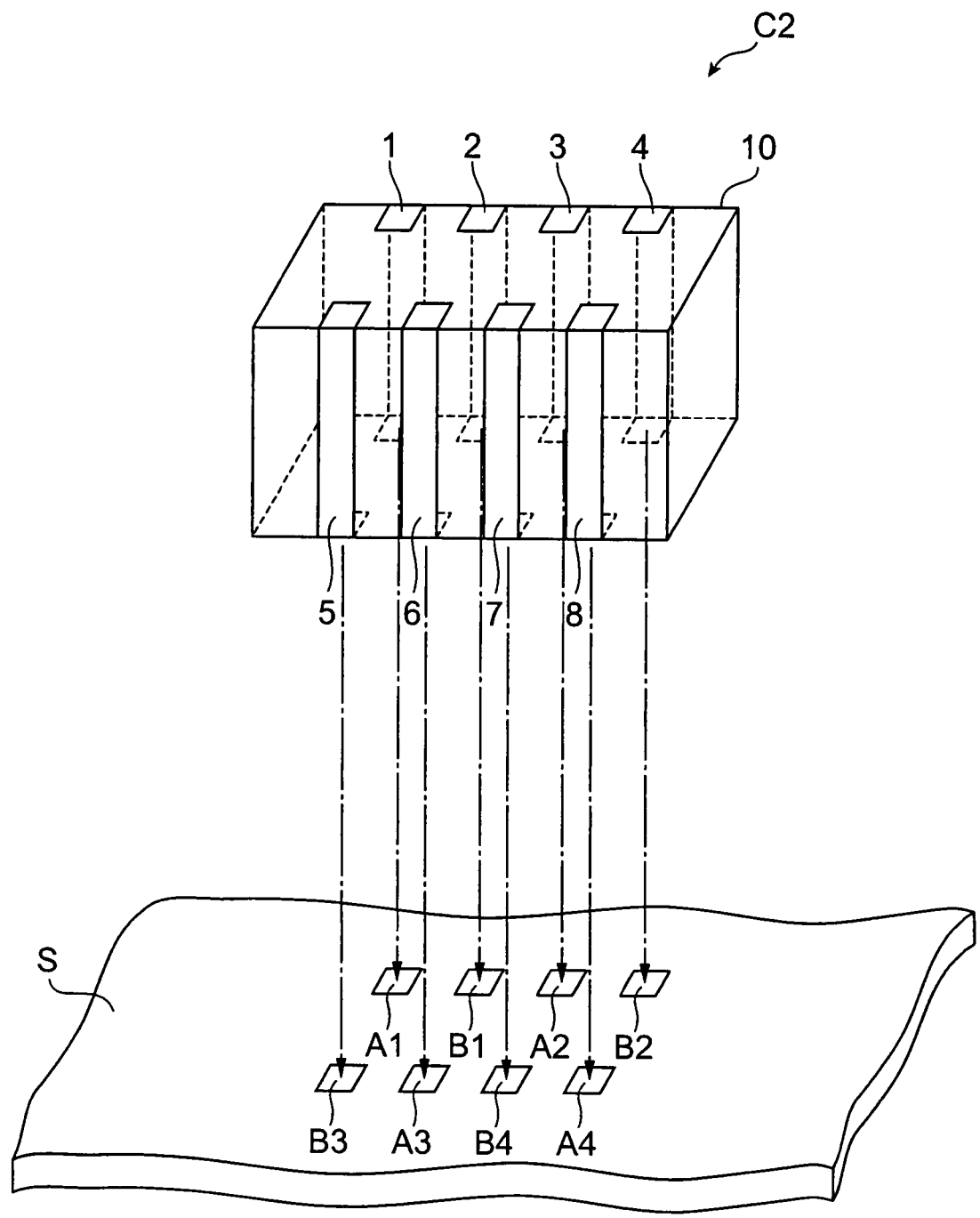
FIG. 11 is a drawing for explaining a mounted structure of the multilayer capacitor of the second embodiment to be mounted onto a circuit substrate.

The multilayer capacitor C2 of the second embodiment can be mounted on a circuit substrate S shown in FIG. 11. FIG. 11 is a drawing for explaining a mounted structure of the multilayer capacitor C2 to be mounted onto a circuit substrate S on which a plurality of land electrodes A1-A4, B1-B4 are formed. In this case, just as in the case of the multilayer capacitor C1, the terminal electrodes 1, 3, 6, 8 are connected to the land electrodes A1-A4, and the terminal electrodes 2, 4, 5, 7 to the land electrodes B1-B4.

In the mounted structure of the multilayer capacitor C2 of the second embodiment on the circuit substrate S, all of the internal electrodes 21-24, 31-34, 41-44, 51-54 included in one internal electrode layer 20, 30, 40, 50 are connected to the land electrodes of the same polarity. Namely, the internal electrodes 21-24, 41-44 all are connected to any of the land electrodes A1-A4 connected to the same polarity. On the other hand, the internal electrodes 31-34, 51-54 all are connected to any of the land electrodes B1-B4 connected to the same polarity.

The substrate S on which the multilayer capacitor C2 of the second embodiment is mounted can be expressed by the same equivalent circuit diagrams as those shown in FIGS. 5 and 6.

The multilayer capacitor C2 of the second embodiment includes the four independent capacitors (capacitance components). Since all of these capacitors all have the different terminal electrodes and are independent of each other, they can be connected all to a single circuit as shown in FIG. 5, or can be connected to a plurality of different circuits as shown in FIG. 6. As described above, the multilayer capacitor C2 of the second embodiment enables its capacitors to be mounted to a plurality of circuits, without need for mounting of a plurality of multilayer capacitors, and can reduce cost in connection to a plurality of circuits.

The multilayer capacitor C2 of the second embodiment can be connected to a substrate or the like so that directions of electric currents flowing through the mutually adjacent internal electrodes are opposite to each other, in the plurality of internal electrodes 21-24, 31-34, 41-44, 51-54 included in one internal electrode layer 20, 30, 40, 50. Namely, for example, in the case where the multilayer capacitor C2 is connected as shown in FIG. 11, the plurality of internal electrodes 21-24, 31-34, 41-44, 51-54 included in each internal electrode layer 20, 30, 40, 50 have the same polarity, but the adjacent internal electrodes 21-24, 31-34, 41-44, 51-54 in the same internal electrode layer are connected to the respective terminal electrode which are formed alternately on the different side faces. For this reason, the directions of electric currents flowing through the mutually adjacent internal electrodes are opposite to each other, in the internal electrodes 21-24, 31-34, 41-44, 51-54. Furthermore, in each internal electrode layer 20, 30, 40, 50, the distance between the internal electrodes is very narrow, 200 μm or less. Therefore, in each internal electrode layer 20, 30, 40, 50, magnetic fields generated by electric currents flowing through the plurality of internal electrodes 21-24, 31-34, 41-44, 51-54 cancel each other, and the equivalent series inductance is reduced in the multilayer capacitor C2 of the second embodiment.

When the distance between the internal electrodes in each internal electrode layer 20, 30, 40, 50 is not more than 100 μm, the equivalent series inductance is more reduced.

In each internal electrode layer 20, 30, 40, 50, the distance between the internal electrodes is not less than 20 μm. For this reason, occurrence of a short circuit is suppressed between the plurality of internal electrodes in each internal electrode layer 20, 30, 40, 50. This leads to prevention of reduction in capacitance due to a short circuit in the multilayer capacitor C2 of the second embodiment.

The above detailed the embodiments, but it is noted that the present invention is by no means limited to the above embodiments. For example, the laminating number of dielectric layers 11-15 and the laminating number of internal electrode layers 20, 30, 40, 50 are not limited to the numbers described in the above-described embodiments. The number of internal electrodes included in each internal electrode layer 20, 30, 40, 50 is not limited to the number described in the above embodiments, but may be, for example, 2, or 5 or more. The shape of the internal electrodes included in each internal electrode layer 20, 30, 40, 50 is not limited to the shape described in the above embodiments, either. The number of terminal electrodes 1-8 is not limited to the number described in the above embodiments.

From the invention thus described, it will be obvious that the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A multilayer capacitor comprising:

a multilayer body in which a plurality of dielectric layers and a plurality of internal electrode layers are alternately laminated; and a plurality of terminal electrodes formed on each of two side faces of the multilayer body opposed to each other, wherein the plurality of terminal electrodes are formed on each of the two side faces so as to be opposed to each other in a facing direction of the two side faces, wherein each of the internal electrode layers includes a plurality of internal electrodes arranged in an array direction along a direction perpendicular to a laminating direction of the multilayer body and parallel to the two side faces, wherein the plurality of internal electrodes included in the respective internal electrode layers adjoining each other in the laminating direction with the dielectric layer in between are located so as to be opposed to each other in the laminating direction through said dielectric layer, wherein the internal electrodes opposed to each other in the laminating direction with the dielectric layer in between are electrically connected to the respective terminal electrodes opposed to each other in the facing direction of the two side faces, wherein the plurality of internal electrodes included in one internal electrode layer are electrically connected to the respective terminal electrodes being different from each other and formed on one of the two side faces, wherein a distance between the internal electrodes included in one internal electrode layer and adjoining each other in the array direction is not less than 20 μm nor more than 200 μm, wherein the multilayer capacitor is mounted on a circuit substrate on which a plurality of land electrodes are formed, wherein the terminal electrodes located as adjoining each other on one side face are connected to respective land electrodes of different polarities, wherein the terminal electrodes opposed to each other in the facing direction of the two side faces are connected to respective land electrodes of different polarities, and wherein the plurality of land electrodes formed on the circuit substrate belong to a plurality of different circuits.

2. A multilayer capacitor comprising:

a multilayer body in which a plurality of dielectric layers and a plurality of internal electrode layers are alternately laminated; and a plurality of terminal electrodes formed on each of two side faces of the multilayer body opposed to each other, wherein the plurality of terminal electrodes are formed on each of the two side faces so as to be opposed to each other in a facing direction of the two side faces, wherein each of the internal electrode layers includes a plurality of internal electrodes arranged in an array direction along a direction perpendicular to a laminating direction of the multilayer body and parallel to the two side faces, wherein the plurality of internal electrodes included in the respective internal electrode layers adjoining each other in the laminating direction with the dielectric layer in between are located so as to be opposed to each other in the laminating direction through said dielectric layer, wherein the internal electrodes opposed to each other in the laminating direction with the dielectric layer in between are electrically connected to the respective terminal electrodes opposed to each other in the facing direction of the two side faces, wherein the internal electrodes included in one internal electrode layer and adjoining each other in the array direction are electrically connected to the respective terminal electrodes formed on the different side faces, and wherein a distance between the internal electrodes included in one internal electrode layer and adjoining each other in the array direction is not less than 20 μm nor more than 200 μm, wherein the multilayer capacitor is mounted on a circuit substrate on which a plurality of land electrodes are formed, wherein the terminal electrodes located as adjoining each other on one side face are connected to respective land electrodes of different polarities, wherein the terminal electrodes opposed to each other in the facing direction of the two side faces are connected to respective land electrodes of different polarities, and wherein the plurality of land electrodes formed on the circuit substrate belong to a plurality of different circuits.

* * * * *